(No Model.)
C. ROTZIEN.
WHEEL OR FELLY SCREW.
No. 291,626.  Patented Jan. 8, 1884.
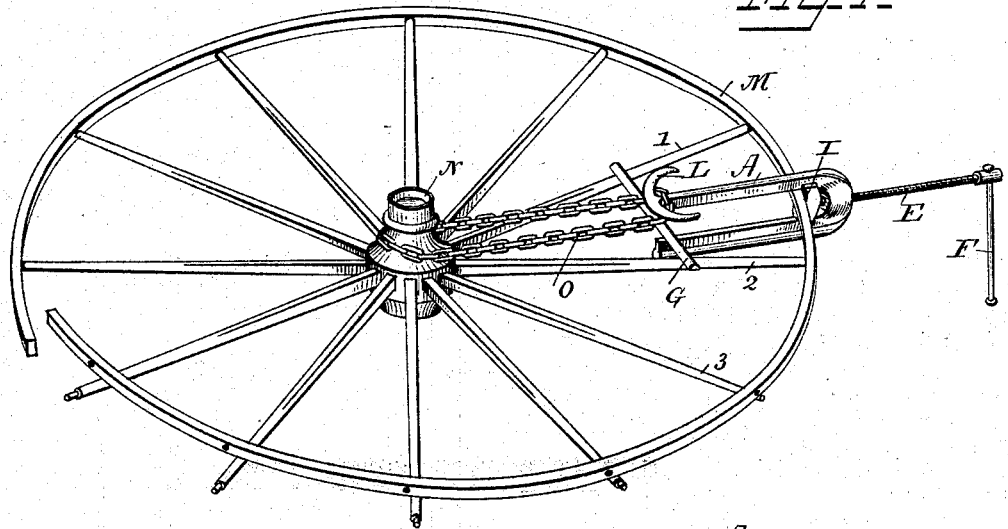
Fig. 1.
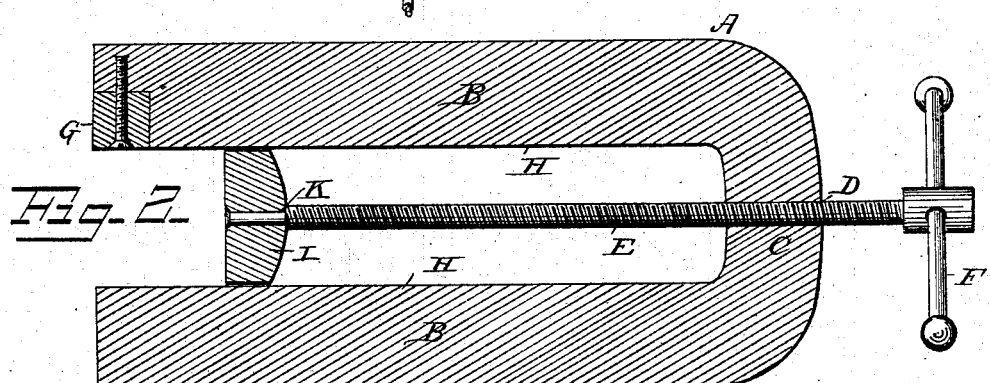
Fig. 2.
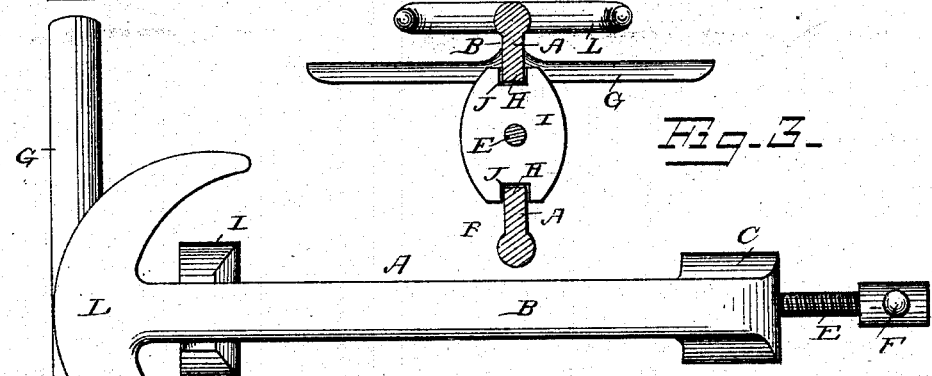
Fig. 3.
Fig. 4.
WITNESSES
F. I. Ourand,
J. R. Littell
C. Rotzien
INVENTOR
by C. A. Snow & Co.
Attorneys.

UNITED STATES PATENT OFFICE.

CHRISTOPH ROTZIEN, OF CUERO, TEXAS.

WHEEL OR FELLY SCREW.

SPECIFICATION forming part of Letters Patent No. 291,626, dated January 8, 1884.

Application filed August 29, 1883. (No model.)

*To all whom it may concern:*

Be it known that I, CHRISTOPH ROTZIEN, a citizen of the United States, residing at Cuero, in the county of De Witt and State of Texas, have invented a new and useful Wheel or Felly Screw, of which the following is a specification, reference being had to the accompanying drawings.

This invention relates to screws for setting vehicle fellies or rims on the tenons of the spokes; and its object is to provide a device possessing superior advantages in point of simplicity, ease of adjustment, and general efficiency, whereby one man can easily and conveniently set the rim.

In the drawings, Figure 1 is a perspective view, showing my improved screw in operating position on the wheel. Fig. 2 is a longitudinal sectional view of the device detached. Fig. 3 is a transverse sectional view of the same. Fig. 4 is a top or edge view.

Referring to the drawings, A designates the main frame, which is approximately U shaped, having side bars, B B, and connecting end portion, C, in which latter is formed a screw-threaded perforation, D, through which works a screw-bar, E, that extends longitudinally between the sides B B, and is provided with an operating handle or crank, F, at its end outside the end portion, C, as shown. The frame A is preferably formed of cast-iron, and is provided at the end of one of its sides B with a transverse bar, G, at right angles to the side B, and preferably formed of malleable iron to prevent its breaking. The inner edges, H H, of the sides B B are squared, as shown, to provide a guide for the follower-block I, which is provided with recesses J J in its side edges to receive the edges H H, and is journaled on the inner end, K, of the screw E.

L is a double hook, that is arranged on the end of the side B, having the bar G, the hook being arranged at the outer edge of the said side B, while the bar G is arranged at its inner edge, and preferably flush with the edge H.

The operation and advantages of my invention will be readily understood. The wheel is first secured to the bench or wheel rack, and the rim M is placed on the spokes 1 and 2, as shown in Fig. 1 of the drawings, and the frame A is then placed so as to straddle the rim M, with the bar G resting upon the spokes. The screw device is secured by a chain passed around the hub N and engaged with the hook L, said chain being designated by the letter O, and the screw E is operated to bind the follower I against the rim at a point between the said spokes 1 and 2. The rim and spokes will thus be clamped together, when, by screwing up tightly, the loose end of the rim will be sprung out sufficiently to engage the next spoke 3, and so on until the whole rim has been set, the screw device being capable of ready adjustment around the rim.

I claim as my invention—

1. The combination of an approximately U-shaped frame, a rest-bar extending across the end of one of the arms of the same, and adapted to rest on the spokes, a screw-bar extending longitudinally and working in the frame, and a follower on the end of said bar, substantially as and for the purpose set forth.

2. The combination of an approximately U-shaped frame, a hook at the end of one of the arms of the same, a screw-bar working through the frame and extending longitudinally, a follower on the end of said bar, and a chain engaged with the hook and adapted to encircle the hub of the wheel, substantially as and for the purpose set forth.

3. The herein-described felly-screw, comprising an approximately U-shaped frame, having a screw-threaded perforation in its end portion, and having its sides formed with inner guide-edges, a transverse support-bar at the end of one of said sides, a double hook at the same end, a longitudinally-extending screw-bar working between said sides, and a follower journaled on the end of said bar, and having recesses in its sides, that receive the said guide-edges, substantially as and for the purpose set forth.

In testimony that I claim the foregoing as my own I have hereto affixed my signature in presence of two witnesses.

CHRISTOPH ROTZIEN.

Witnesses:
J. P. BAKER,
A. B. DAVIDSON.